United States Patent [19]
Kraus

[11] 3,721,529
[45] March 20, 1973

[54] APPARATUS FOR CARBON BLACK PRODUCTION

[75] Inventor: Gerard Kraus, Bartlesville, Okla.

[73] Assignee: Phillips Petroleum Company, Bartlesville, Okla.

[22] Filed: Jan. 18, 1971

[21] Appl. No.: 107,078

Related U.S. Application Data

[62] Division of Ser. No. 740,540, June 27, 1968, Pat. No. 3,582,277.

[52] U.S. Cl. ..................23/259.5, 431/173, 431/175, 431/176, 23/277 R
[51] Int. Cl. ...............................................C09c 1/50
[58] Field of Search ...23/259.5, 209.4, 209.6, 277 R; 423/450

[56] References Cited

UNITED STATES PATENTS

| | | | |
|---|---|---|---|
| 3,098,883 | 7/1963 | Heuse et al. | 23/277 R X |
| 3,410,660 | 11/1968 | Henderson et al. | 23/259.5 X |
| 2,924,512 | 2/1960 | Webster et al. | 23/259.5 |

*Primary Examiner*—James H. Tayman, Jr.
*Attorney*—Young and Quigg

[57] ABSTRACT

Apparatus for the production of carbon black wherein a hydrocarbon feed is contacted with two generally countercurrent impinging masses of hot combustion gases and the resulting mixture passed into a reaction zone wherein the hydrocarbon feed is pyrolytically decomposed into carbon black.

3 Claims, 1 Drawing Figure

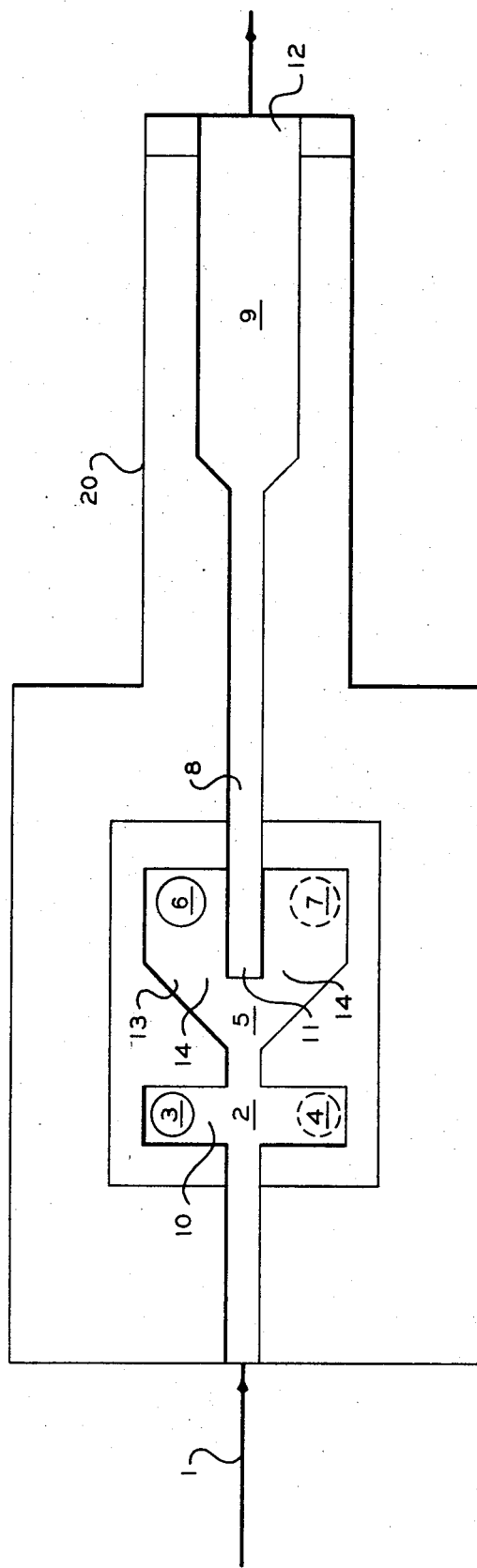

APPARATUS FOR CARBON BLACK PRODUCTION

This is a divisional application of my application Ser. No. 740,540, filed June 27, 1968, now U.S. Pat. No. 3,582,277.

This invention relates to an apparatus and a method of making carbon black. In one of its more specific aspects, this invention relates to apparatus and a process for producing carbon black having improved properties.

Carbon black, which is widely used in the manufacture of rubber, is evaluated as to its suitability for its many uses in terms of various properties. One of these properties is generally termed "structure". "Structure", as used herein, shall mean that property as measured by the dibutyl phthalate absorption number as defined by ASTM Tentative Test Method Designation D 2414-65T, issued 1965, or by any other property correlative with this test method and with carbon black structure, such as mineral oil absorption, structure index, hand oil absorption, and the like.

There has now been discovered a process and apparatus for the production of carbon black by means of which the structure of carbon black can be controlled.

According to the method of this invention, there is provided a process for the production of carbon black by the pyrolysis of hydrocarbons in which there is established a plurality of combustion gas mixtures which are introduced into the reaction zone in rotational relationship to a hydrocarbon reactant passing through the reaction zone, to effect envelopment of the reactant and to raise its temperature to the carbon black producing temperature.

The apparatus of this invention comprises a reactor having an axially disposed reaction zone and a plurality of combustion chambers in open communication therewith, the combustion chambers adapted for discharging into the reaction zone in impinging relationship upon each other.

Accordingly, it is an object of this invention to provide a new process for the production of carbon black.

It is also an object of this invention to provide a new reactor for the production of carbon black.

These and other objects will be evident from the following discussion, particularly when read in conjunction with the attached drawing which is an elevation view of the apparatus of this invention.

In the production of carbon black, it is conventional practice to introduce a hydrocarbon reactant into a reaction zone and to introduce into the same reaction zone combustion gases in a manner so as to envelope the hydrocarbon reactants, and to pass the entire mass through the reaction zone, the hydrocarbon reactant being raised in temperature to the carbon black forming temperature. For the purpose of introducing the combustion gases, a combustion zone is supplied.

In one of the preferred embodiments, this invention is directed toward a method and apparatus in which two combustion chambers are supplied, the chambers being adapted to establish opposite revolving masses of combustion gases which impinge upon each other when introduced into the impingement zone, the resulting reaction mass thereafter being directed in a direction of flow generally opposite that of at least one of the revolving masses prior to its introduction into the impingement zone.

The apparatus and method of this invention is generally applicable to the use of the conventional hydrocarbons for the production of carbon black. Similarly, the invention is generally applicable to the use of the conventional fuels and free oxygen-containing gases for the oxidation of the fuel to form the combustion gases.

By combustion gases are meant those gases which are the products of combustion and which are employed for the purpose of adding heat to the reaction zone. Such gases are generally generated by burning a fuel, such as natural gas, methane, propane, or oils with a free oxygen-containing gas such as air, either within a section of the reactor or outside of the reactor.

This invention is generally applicable to the conventional operating conditions of temperatures, pressures, and the like used in the production of carbon black.

Referring now to the aforementioned drawing, there is shown in outline reactor 20 having a hydrocarbon inlet 1, an elongated chamber 8 in which a principal portion of the carbon black is formed, quench zone 9 in which the reaction is terminated and carbon black outlet 12 from the reactor. The entire reactor is surrounded, in the usual manner, by insulation not shown.

The hydrocarbon reactant is introduced through hydrocarbon inlet 1 with, or without, air in the usual manner, and may be preheated.

Combustion chamber 10 is equipped with tangential entry ports 3 and 4 which allow for the introduction of a fuel and the oxidant, for simplicity referred to as air hereinafter, to produce high temperature combustion gases which envelope and mass of reactants at zone 2, the mass thereafter proceeding to zone 5. Some portion of the hydrocarbon reactant can also be introduced through ports 3 and 4 which can enter radially as well as tangentially into the reactor.

A second combustion chamber 13, preferably having a conical configuration, is supplied. It is equipped with tangential entry ports 6 and 7 which allow for the introduction of fuel and air in a manner similar to that of chamber 10. However, chamber 13 encircles a portion of reaction zone 8 and is equipped with tunnels 14 which, in combination with the tubular extension of zone 8, cause an angular discharge of the hot combustion gas mass from chamber 13 in a direction generally in opposition of the reactant flow from zone 2.

At impingement zone 5, the hydrocarbon reactant and its envelopment of combustion gases from combustion chamber 10 are commingled with the combustion gases entering from zone 13 in impinging relationship, the entire mass thereupon entering chamber zone 8 through opening 11 which extends into impingement zone 5, with the subsequent formation of carbon black which is recovered from outlet 12.

The reactor can be operated in a number of different ways. By selecting the points at which the air and fuel gas are introduced into combustion chambers 10 and 13, combustion masses rotating in opposed or in cocurrent directions, in relation to each other, can be established.

Similarly, chambers 10 and 13 can be operated at different stoichiometries, i.e., with an excess of fuel or excess of air, to control heat release from the masses of combustion gases. For example, one chamber can be operated with an excess of air, the other chamber with an excess of fuel. Similarly, the proportion of total combustion gases introduced into zone 5 from chambers 10 and 13 can be varied over wide ranges. In these, and in other ways, and in particular by varying the air and fuel ratios introduced into the two chambers, carbon black structure can be controlled as shown in the following examples. In this respect, as the ratio of the amount of air introduced into chamber 10 to the amount of air introduced into chamber 13 approaches unity, the structure of the carbon black is lowered. This ratio will hereinafter be referred to as the combustion chamber air ratio.

EXAMPLE I

A series of runs was conducted for the production of carbon black using a reactor of the general configuration of that described. Propane was burned as fuel in air in the combustion chambers. Benzene was used as the hydrocarbon reactant, being introduced as vapor into the reactor at a temperature varying from 440° to 540°F., this difference in benzene feed temperature being only nominally influential in reactor operation or on the properties of carbon black produced inasmuch as the heat balance variation resulting therefrom is minimal in consideration of the other thermodynamic aspects of the reaction.

Opposed rotation of the vortexes in chambers 10 and 13 was employed and variations were made in the proportions of air and propane introduced to the respective combustion chambers, while maintaining the total quantities of air and propane relatively constant.

Run 1 is a control run in which combustion gases were introduced only through that combustion chamber corresponding to the second chamber, that is, chamber 13 of the figure previously discussed.

Quantities of air and fuel introduced are expressed in the data as being introduced through the first combustion chamber 10 or the second combustion chamber 13 positioned in the reactor as indicated in the attached FIGURE. In all runs except control run number 1, opposed rotation within combustion chambers was employed.

first combustion chamber to that supplied to the second combustion chamber approached unity, the structure increasing again as this ratio rose above unity. Relatedly, these data, and particularly Run 4, demonstrate that a still further reduction in structure is obtained at a combustion chamber air ratio of unity, if the quantities of fuel and air to one of the chambers are at unequal flow rates through the individual inlets thereto.

The respective carbon blacks produced in the above runs were further compared as to their ultimate properties by blending in a rubber compounding recipe of the following composition.

RUBBER COMPOUNDING RECIPE

| Component | Parts by Weight |
|---|---|
| SBR 1006 (1) | 100 |
| Zinc Oxide | 3 |
| Highly Aromatic Oil | 6 |
| Sulfur | 1.75 |
| Santocure (2) | 0.9 |
| Carbon Black | 40 |

(1) ASTM D 1419–61T, recipe for type 1006.
(2) N-cyclohexyl-2-benzathiazolesulfenamide.

Each of the carbon blacks produced from the runs of Table I were incorporated in the recipe to the extent of 40 parts by weight per 100 parts of rubber, the resulting stocks were cured for 30 minutes at 307°F. The following determinations were made as to the properties of the vulcanized rubber stock.

TABLE II

| Carbon black from run No. | 1 | 2 | 3 | 4 | 5 | 6 | 7 |
|---|---|---|---|---|---|---|---|
| Cross link density,* $\gamma \times 10^4$ mols/cc | 1.38 | 1.41 | 1.29 | 1.30 | 1.25 | 1.31 | 1.42 |
| 300 modulus,** p.s.i. | 1,130 | 1,160 | 960 | 910 | 880 | 1,150 | 1,350 |
| Tensile strength,** p.s.i. | 3,340 | 3,450 | 2,870 | 3,080 | 2,970 | 3,370 | 3,380 |
| Elongation,** percent | 560 | 560 | 530 | 575 | 565 | 575 | 525 |
| $\Delta T$,*** °F. | 68.7 | 66.5 | 64.5 | 65.7 | 67.7 | 67.6 | 67.4 |
| Resilience,**** percent | 61.5 | 63.9 | 63.8 | 63.5 | 62.5 | 62.5 | 62.8 |
| Shore A hardness***** | 58 | 58 | 56 | 55 | 55 | 56.5 | 58 |

*Number of effective network chains per unit volume of rubber. Rubber World 135, 67–73; 254–260 (1956).
**ASTM D 412–62T.
***ASTM D 623–62.
****ASTM D 945–59.
*****ASTM D 1706–61 Shore Durometer, Type A.

These rubber data indicate that the lowest modulus was obtained from carbon blacks made at equal air

TABLE I

| Run No. | 1 | 2 | 3 | 4 | 5 | 6 | 7 |
|---|---|---|---|---|---|---|---|
| Feed rate, lbs./hr | 18.8 | 16.8 | 16.6 | 12.9 | 30.1 | 16.3 | 16.0 |
| Feed inlet temp., °F | 440 | 450 | 440 | 520 | 540 | 535 | 445 |
| Total air rate, s.c.f.h. | 2,020 | 2,006 | 2,000 | 2,000 | 3,590 | 1,990 | 2,004 |
| Air into chamber 10 | 0 | 502 | 1,000 | 1,000 | 1,790 | 1,250 | 1,498 |
| Air into chamber 13 | 2,020 | 1,540 | 1,000 | 1,000 | 1,800 | 740 | 506 |
| Combustion chamber air ratio | 0 | 0.33 | 1 | 1 | 1 | 1.7 | 3 |
| Stoichiometric air, percent to chamber 10 | 0 | 151 | 150 | *75/150 | 149 | 150 | 149 |
| Stoichiometric air, percent to chamber 13 | 153 | 150 | 150 | 150 | 150 | 146 | 148 |
| Total fuel rate, s.c.f.h | 56.4 | 57 | 56.8 | 70.5 | 102.4 | 57 | 57.4 |
| Fuel into chamber 10, s.c.f.h | 0 | 14.2 | 28.4 | *28.2/14.1 | 51.2 | 35.4 | 42.8 |
| Fuel into chamber 13, s.c.f.h | 56.4 | 42.8 | 28.4 | 28.2 | 51.2 | 21.6 | 14.6 |
| Carbon black yield, based on C in feed, percent | 41.3 | 43.5 | 42.0 | 48 | 41.5 | 42.5 | 38.8 |
| Carbon black properties: | | | | | | | |
| Photelometer** | 81 | 83 | 89 | 89 | 93 | 96 | 94 |
| pH*** | 8.6 | 8.5 | 8.7 | 8.8 | 8.4 | 8.7 | 8.5 |
| $N_2$ surface area, m.²/g | 122 | 111 | 92 | 95 | 110 | 97 | 104 |
| Oil absorption, cc./g.**** | 1.42 | 1.30 | 1.13 | 1.05 | 1.11 | 1.10 | 1.25 |

* Different quantities of propane and air introduced through each of the two ports in chamber 10.
** ASTM D 1618–58T.
*** ASTM D 1512–60.
**** ASTM D 281–31 spatula rub-out test.

Generally, the amount of air introduced in all runs was essentially the same as was the amount of fuel, or propane, for all runs except Run 4.

These data show that the structure of the carbon black, as represented by the oil absorption test, was lowered as the ratio of the amount of air supplied to the input to both combustion chambers, consistent with that data on the carbon black, itself, indicating that the lowest structure was obtained when the combustion chamber air ratio was unity.

EXAMPLE II

A run was made in the previously described reactor under comparable operating conditions, using benzene as the hydrocarbon reactant and burning propane with air to form the hot combustion gases in each of the two combustion chambers. In this run, the combustion gases issuing from each of the two combustion chambers were caused to rotate in cocurrent directions.

TABLE III

| | |
|---|---|
| Run No. | 8 |
| Benzene Rate, lbs./hr. | 15.7 |
| Benzene Inlet Temp., °F. | 530 |
| Total Air Rate, SCFH | 2000 |
| Into Chamber 10 | 1000 |
| Into Chamber 13 | 1000 |
| Combustion Chamber Air Ratio | 1 |
| Stoichiometric Air, % to Chamber 10 | 146 |
| Stoichiometric Air, % to Chamber 13 | 146 |
| Total Propane Rate, SCFH | 58.6 |
| Into Chamber 10, SCFH | 29.2 |
| Into Chamber 13, SCFH | 29.4 |
| Carbon black yield, based on C in feed | 46.6 |
| Carbon Black Properties | |
| Photelometer | 92 |
| pH | - |
| $N_2$ Surface Area, $M^2/g$ | 109 |
| Oil Absorption, cc/g | 1.10 |

These data are comparable with those of Run 3 of Table I, and indicate that the process of this invention can be operated to introduce, in enveloping relationship to the hydrocarbon reactant, cocurrently rotating combustion gas masses to give a product of lower structure and a higher surface area than that produced in the absence of the practice of this invention under otherwise comparable conditions, as indicated, for example, by the product produced in Run 3, supra.

The process and apparatus of this invention has been described in terms of simple embodiments without intending to limit the invention thereto. Modifications thereof will be apparent, but are not considered as being outside of the scope of the invention.

What is claimed is:

1. A carbon black reactor comprising:

a. a first combustion section adapted with first entry-conduit means for the introduction of reactants thereinto;

b. an impingement section positioned downstream of said first combustion section;

c. first conduit means opening from said first combustion section into said impingement section, said first conduit means having a diameter less than the diameters of said first combustion section and an after-defined second combustion section;

d. a second combustion section adapted with second entry-conduit means for the introduction of reactants thereinto through the circumferential periphery thereof and with second conduit means opening from said second combustion section into said impingement section, said second conduit means being angularly disposed inwardly towards the longitudinal axis of said reactor and discharging from said second combustion section proximate the locus of discharge of said first conduit means;

e. an elongated reaction section having an upstream opening thereinto positioned proximate the locus of discharge from said first and said second conduit means; and, f. third conduit means adapted for recovering carbon black from said elongated reaction section.

2. The reactor of claim 1 in which said first entry-conduit means open into said first combustion section to discharge thereinto in a first direction and said second entry-conduit means open into said second combustion section to discharge thereinto in a second direction opposite to said first direction.

3. The reactor of claim 2 in which said first combustion section is adapted with conduit means for axial introduction of hydrocarbon.

* * * * *